Sept. 29, 1942.   J. T. WEBBER   2,297,641
APPARATUS FOR DETERMINING THE FREEZING POINT OF LIQUIDS
Filed Dec. 11, 1939
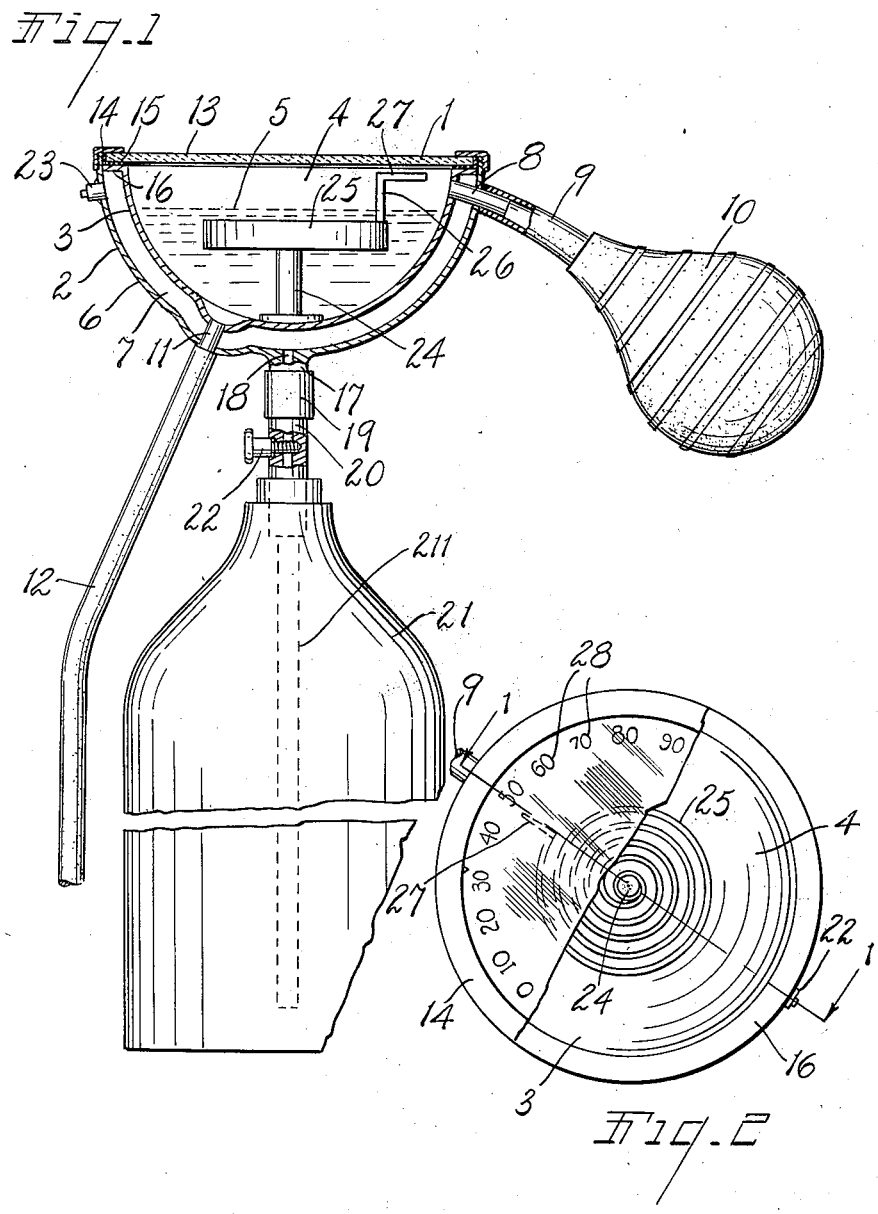
INVENTOR.
Joseph T. Webber
BY Earl T. Chappell
ATTORNEYS Patented Sept. 29, 1942

2,297,641

UNITED STATES PATENT OFFICE 2,297,641

APPARATUS FOR DETERMINING THE FREEZING POINT OF LIQUIDS

Joseph T. Webber, Kalamazoo, Mich., assignor, by mesne assignments, to Lacey-Webber Co., Kalamazoo, Mich., a corporation of Michigan Application December 11, 1939, Serial No. 308,678

5 Claims. (Cl. 73—51)

This invention relates to improvements in apparatus for determining the freezing point of liquids.

The main objects of my invention are:

First, to provide a novel apparatus for determining the freezing point of liquids or liquid mixtures.

Second, to provide apparatus of a practical, readily usable nature for performing the foregoing determination.

Third, to provide a device adapted to receive a quantity of a liquid of which it is desired to ascertain the freezing point and having provisions for readily and quickly congealing the liquid whereby to determine the freezing point in accordance with the purpose of my invention.

Fourth, to provide a device including a thermally responsive element and means for bringing this element into contact with the liquid to be tested whereby following the congealing of the liquid in accordance with my invention the freezing point thereof may be readily and accurately ascertained.

Fifth, to provide a device including thermally responsive means, a calibrated scale associated therewith, and a receptacle enclosing said means and a liquid to be tested, said device being adapted to be subjected to freezing or subfreezing temperatures whereby to congeal the liquid and enable the freezing point thereof to be directly read from the device.

Further objects relating to details and economies of my invention will definitely appear from the description to follow. The invention is defined in the claims.

A structure embodying the features of my invention is illustrated in the accompanying drawing, wherein:

Fig. 1 is a fragmentary view in elevation, partially broken away and in section on line 1—1 of Fig. 2, illustrating a preferred embodiment of apparatus for determining the freezing point of a liquid or liquid mixture in accordance with my invention.

Fig. 2 is a fragmentary top plan view illustrating further details of construction of the testing device of my invention, the top indicating dial being partially removed to clarify the construction.

In many commercial connections, it is desirable to quickly and conveniently ascertain the freezing point of a liquid or liquid mixture; for example, in garages and service stations, the discovery of the freezing point of a radiator antifreeze solution or, alternatively, of a battery electrolyte in the quickest and most convenient manner is a matter of considerable importance. In my copending application Serial No. 273,661, filed May 15, 1939, I illustrate an improved thermohydrometer of the general type presently used for this purpose. Instruments of this type are commonly employed to ascertain freezing points of radiator anti-freeze solution by determination of temperature corrected specific gravity of liquid solution. In all such instruments now on the market, a certain amount of manipulation and calculation is necessary and although the instrument of the foregoing application was particularly devised to reduce the necessary operations to a minimum, there is nevertheless need for a certain amount of manipulation by the attendant in using the same.

So far as I am aware, there is not at present available any device which is capable of ascertaining liquid freezing points without resort to calculations based on specific gravity of the liquid tested and, moreover, which enables a direct reading of freezing point to be taken. It is with this general end that my present invention is concerned, and it departs radically from the usual approach in that instead of relying on any measure or determination of uncorrected or temperature corrected specific gravity, it contemplates actually subjecting a temperature responsive element to thermal actuation by the liquid in question, whereby when the latter reaches its freezing point, the further movement of said element or another element operatively connected to and actuated by said element will be retarded or substantially impeded. By associating a suitably calibrated and visually readable scale with the said element or other member actuated thereby, I make it possible to directly read from the scale the point at which the liquid in question commences to congeal or form a slush as indicated by the retarded or halted element or member, without requiring any mental calculation or chart reference or consultation or auxiliary manipulation on the part of the user. This is the broad aspect of my invention. More specifically, my invention includes practical means for enabling the aforesaid operation to be performed quickly and conveniently, in the form of a suitable receptacle for receiving the liquid to be tested and for mounting the thermally responsive element, means for drawing into the receptacle a suitable quantity of liquid to be tested, and means for associating the receptacle with a suitable source of refrigeration, all as will be hereinafter discussed in detail. However, it will be apparent to those skilled in the art that practical applications of the broad concept of my invention can be made in a number of different ways and therefore I do not regard the same as limited to the particular preferred embodiment of the device for actuating the same which I have chosen to illustrate.

In the drawing, the reference numeral 1 in general indicates the device of my invention which consists of a suitable double walled receptacle 2 having an inner wall 3 forming a chamber 4 adapted to receive a quantity of the liquid 5 to be tested and outer wall 6 coacting with the wall 3 to form a refrigerating compartment 7 to constitute a space adapted to receive a quantity of refrigerating substance and/or gas, such as solid carbon dioxide and the vapor attending its formation, in heat conducting relation to the inner chamber. It will be obvious to those skilled in the art that if desired the outer wall 6 may be suitably insulated in order to prevent undue loss of efficiency through ingress of heat from the atmosphere by conduction to the chamber 7.

I have illustrated the receptacle 2 as being of a generally hemispherical shape, this being now deemed the most practical outline for practical reasons of production; however, obviously, this particular shape may be modified if found desirable for other reasons.

Extending through the space or refrigerating compartment 7 and communicating with the interior of the chamber 4 is a hollow tubular fitting 8 having an extension tube 9 and collapsible bulb 10 connected therewith for drawing the liquid to be tested, 5, into the chamber 4. Likewise communicating with the interior of chamber 4 adjacent the bottom of the same is a fitting 11 to which is connected an extension hose 12 through which liquid to be tested is adapted to be drawn and expelled upon actuation of the bulb 10 in a manner which will be obvious.

The upper side of the receptacle 2 is covered by a closure plate 13, this plate being clamped on the receptacle by means of a threaded annular sealing ring 14. A suitable gasket 15 is interposed between the cover plate 13 and receptacle in order to render the same air tight. It will be observed that the inner wall 3 is flanged radially outwardly at its uppermost edge, as indicated by the reference numeral 16, to completely enclose the chamber 7 and at the same time form a seat for the cover plate. This flange may be permanently secured to the outer receptacle wall 6 as by soldering, if desired.

At its lowermost point and preferably concentrically thereof, the outer wall 6 of the receptacle is provided with a suitable boss 17 apertured at 18, to which is attached a suitable coupling member or fitting 19. The coupling member is of my appropriate type adapted to be received over the nozzle 20 of a conventional cylindrical container 21 adapted to contain a suitable refrigerating medium, preferably liquid carbon dioxide, under relatively high pressure. It is the usual custom to provide such containers with a control or discharge valve or cock 22. When the latter is cracked, the liquid under pressure will escape from the container through the vertical eduction tube 211 vaporizing rapidly in part and also forming a quantity of solidified $CO_2$, with the result that the interior of the compartment 7 is filled with a mixture of gaseous and solid carbon dioxide, the temperature of the latter of which is $-110°$ F.

A suitable cock 23 is provided adjacent the upper side of compartment 7 to vent the chamber when it is desired to replenish the contents of the same.

By the foregoing provisions, it will be apparent that the interior of the receptacle may be quickly subjected to a temperature which is far below the freezing point of most of the liquids which will be tested thereby, so that the latter when subjected to this temperature will be quickly brought to a freezing temperature or a temperature at which congelation begins so that a slush is formed.

Concentrically mounted within the interior of receptacle 4 is an upstanding post 24 to which a thermally responsive bimetalilc coil 25 is fixedly secured at its innermost or central point. This coil is adapted to be immersed in liquid drawn into the receptacle, as illustrated in Fig. 1, and terminates in an upstanding indicating member or finger 26 having a pointer 27 adapted to swing throughout a considerable arcuate range in response to changes in the temperature of the liquid. In the preferred embodiment, the cover plate 13 is of transparent glass and has printed or otherwise impressed thereon a scale calibrated in temperature indicia 28, so that by observing the position of pointer 27 at any given instant the temperature of the liquid in the receptacle affecting the coil 25 may be read directly from the scale. It is of course possible to utilize a non-transparent plate 13 if desired, so long as suitable provisions are made for exposing the temperature indicating element to coact therewith. However, I find the present construction is preferable inasmuch as it allows the receptacle to be entirely sealed at its top. In any event, I desire to repeat that the invention is not of a particularly limited nature in connection with the type of receptacle that is employed.

From the foregoing, it will be apparent that when a quantity of liquid to be tested is admitted to the receptacle and subjected to a freezing temperature by admission of carbon dioxide refrigerant to the freezing compartment 7, the temperature of the liquid will be very quickly reduced to a point at which it begins to congeal. At this point, further movement of that element and indicating member 26 is resisted, with the result that the point at which such movement is substantially slowed down or impeded may be relied on as the temperature at which the aforesaid slush is formed. As the temperature is further and further reduced, this slush becomes stiffer in consistency until it reaches a point at which movement of the pointer is practically prevented. With a little practice, a user will be able to ascertain the point at which the resistance to movement of the bimetallic element becomes so great as to indicate that the slush formed has reached a dangerous state so far as its effect on the operation of the engine is concerned. In other words, it may be readily ascertained when the anti-freeze material has reached a critical point beyond which, if the temperature is further reduced, damage to the engine, such, for example, as the shearing of a driving pin for the circulating pump or the insufficient circulation of cooling agent to carry off heat from the engine, will result. The temperature corresponding to this point may be readily read off from the calibrated scale on the cover plate. It is unnecessary to carry out the freezing procedure to an extreme degree, but only so far as is requisite to cause noticeable slowing down of the movement of the bimetallic element. Because of the extremely low temperature of the refrigerant employed, the movement of the pointer prior to formation of the slush is relatively rapid and the aforesaid slowing down thereof is clearly noticeable. After observing the temperature indicated, the refrigerant may be removed and the contents of the receptacle will soon become warmed sufficiently to liquefy the same and permit discharge thereof from chamber 4. Obviously, due to the intense cold of the refrigerant preferably employed, only a very slight quantity thereof need be admitted to compartment 7.

I have illustrated in its preferred embodiment and described a device embodying my invention. I am well aware that alterations in this preferred embodiment will readily occur to those skilled in the art, such as indirect rather than direct application of the movement of the thermally responsive element to an indicating member or device, by intermediate linkage and the like. Furthermore, it will be evident that other methods of freezing the contents of the receptacle are equally applicable, for example by bringing the same into heat transferring relation to a suitable refrigerated mass or otherwise subjecting the same to a congealing condition. I consider that such obvious expedients fall within the scope of the invention limited only by the following claims.

Many practical uses for the apparatus which I have described will occur to those skilled in the art. As a laboratory testing instrument it will be found invaluable, since it obviously can be constructed to operate with whatever degree of accuracy is desired. As a practical aid to garage men, service station attendants, and the like, it has the advantages of speed of servicing which it makes possible and the fact that it has relatively few and inexpensive parts, which renders it capable of being produced at a very nominal cost. Furthermore, the direct and visual indication of the freezing point of any liquid whatsoever has definite appeal, since it will enable a service man to actually show a customer the freezing point for, for example, his radiator antifreeze solution and the like. Such a directly recording and graphic type instrument will greatly increase the customer's confidence in the service he receives. Obviously, this method of determining freezing points of liquids is not subject to many variable factors, such as the type and specific gravity of the liquid tested, for, as pointed out above, it operates on a different principle entirely from hitherto known or attempted methods.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. Apparatus for ascertaining the freezing point of liquids, comprising a receptacle including a chamber adapted to receive a quantity of the liquid to be tested, said receptacle having a compartment surrounding the same at least in part and adapted to receive a refrigerant, whereby liquid in the chamber may be reduced to its freezing point, a coiled bimetallic element fixedly mounted at its center in said chamber and adapted to be immersed in and directly in contact with liquid admitted to the chamber, said element having an indicating member at its free end adapted to be positioned relative to the receptacle in accordance with the temperature of the liquid, and a scale on said receptacle coacting with said indicating member whereby the freezing point of the liquid may be readily observed at the time of congelation thereof, the mechanical movement of said element and indicating means being substantially halted at that point.

2. Apparatus for ascertaining the freezing point of liquids, comprising a receptacle including a chamber adapted to receive a quantity of the liquid to be tested, said receptacle having refrigerating means associated therewith whereby liquid in the chamber may be reduced to its freezing point, a coiled bimetallic element fixedly mounted in said chamber and adapted to be immersed in and directly in contact with liquid admitted to the chamber, said element having an indicating member at its free end adapted to be positioned relative to the receptacle in accordance with the temperature of the liquid, and a scale on said receptacle coacting with said indicating member whereby the freezing point of the liquid may be readily observed at the time of congelation thereof, the mechanical movement of said element and indicating means being substantially halted at that point.

3. Apparatus of the type described, comprising a double walled hollow receptacle providing a container to receive liquid to be tested and a refrigerating chamber at least partially surrounding said container in heat transfer relation thereto, means for drawing into said container a quantity of the liquid to be tested, a coiled thermally responsive bimetallic member disposed in said container in position to be at least partially immersed in and directly in contact with liquid admitted to the same, said member having a temperature indicating element thereon, a hollow fitting on said receptacle, a container of refrigerating material connected to said fitting for supplying refrigerating material to said chamber, and a closure for said receptacle having a transparent portion provided with a scale calibrated in terms of temperature and coacting with said temperature indicating element to afford a visual indication of the temperature of the liquid when the latter is at least partially congealed by lowering of its temperature due to admission of refrigerant from said supply to said refrigerating chamber.

4. Apparatus of the type described, comprising a double walled hollow receptacle providing a container to receive liquid to be tested and a refrigerating chamber in heat transfer relation thereto, means for at least partially filling said container with a quantity of the liquid to be tested, a coiled thermally responsive bimetallic member disposed in said container in position to be at least partially immersed in and directly in contact with liquid admitted to the same, said member having a temperature indicating element thereon, a container of refrigerating material connected to said receptacle for supplying refrigerating material to said chamber, means for connecting said chamber with said supply, and means on said receptacle having a scale calibrated in terms of temperature and coacting with said temperature indicating element to afford a visual indication of the temperature of the liquid when the latter is at least partially congealed by lowering of its temperature due to admission of refrigerant from said supply to said refrigerating chamber.

5. Apparatus for ascertaining the freezing point of a liquid, comprising a container for receiving a quantity of the liquid to be tested, means for refrigerating said chamber to at least partially congeal liquid contained therein, a thermally responsive bimetallic element disposed in said container in position to be at least partially immersed in and directly in contact with liquid admitted to the latter, said element having indicating means associated therewith and adapted to be movably positioned in accordance with the temperature of the liquid influencing the element and to be impeded in its movement when congelation of the liquid takes place, and means coacting with said temperature indicating means to afford an indication of the temperature corresponding to the point of congelation of the liquid.

JOSEPH T. WEBBER.